US011216979B2

(12) United States Patent
Tezaur

(10) Patent No.: US 11,216,979 B2
(45) Date of Patent: Jan. 4, 2022

(54) DUAL MODEL FOR FISHEYE LENS DISTORTION AND AN ALGORITHM FOR CALIBRATING MODEL PARAMETERS

(71) Applicant: Intel Corporation, Santa Clara, CA (US)

(72) Inventor: Radka Tezaur, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/135,025

(22) Filed: Dec. 28, 2020

(65) Prior Publication Data

US 2021/0118181 A1 Apr. 22, 2021

Related U.S. Application Data

(63) Continuation of application No. 16/143,880, filed on Sep. 27, 2018, now Pat. No. 10,878,595.
(Continued)

(51) Int. Cl.
| | |
|---|---|
| *H04N 5/232* | (2006.01) |
| *G06T 7/80* | (2017.01) |
| *H04N 5/247* | (2006.01) |
| *G06T 7/00* | (2017.01) |
| *G06T 5/00* | (2006.01) |
| *G02B 13/06* | (2006.01) |

(52) U.S. Cl.
CPC ............. *G06T 7/80* (2017.01); *G06T 5/006* (2013.01); *G06T 7/85* (2017.01); *G06T 7/97* (2017.01); *H04N 5/23238* (2013.01); *H04N 5/247* (2013.01); *G02B 13/06* (2013.01); *G06T 2207/30208* (2013.01)

(58) Field of Classification Search
CPC ............................. H04N 5/23238; G06T 7/80
USPC ......................................................... 348/241
See application file for complete search history.

(56) References Cited

U.S. PATENT DOCUMENTS

| | | | |
|---|---|---|---|
| 5,479,220 A | 12/1995 | Komatsu et al. | |
| 8,416,322 B2 * | 4/2013 | Kasahara | ........... H04N 5/35721 348/241 |

(Continued)

OTHER PUBLICATIONS

Bermudez et al., "Calibration of Omnidirectional Cameras in Practice: A Comparison of Methods" Computer Vision and Image Undertanding vol. 116, pp. 120-137 May 2012, 24 pages.
(Continued)

*Primary Examiner* — Anthony J Daniels
(74) *Attorney, Agent, or Firm* — Hanley, Flight & Zimmerman, LLC

(57) ABSTRACT

An example apparatus enabling a dual fisheye model and calibration is described. The apparatus includes at least one memory; and at least one processor to execute instructions to: generate a first set of coefficients for an inverse distortion polynomial, the inverse distortion polynomial indicative of radial distortion of an image captured by a camera; generate a second set of coefficients for an alternative distortion polynomial, the alternative distortion polynomial to enable identification of a first point in the image corresponding to a second point in a three-dimensional space represented by the image; and determine a location of the camera within the three-dimensional space based on at least one of the inverse distortion polynomial or the alternative distortion polynomial.

21 Claims, 9 Drawing Sheets

Related U.S. Application Data

(60) Provisional application No. 62/692,937, filed on Jul. 2, 2018.

(56) References Cited

U.S. PATENT DOCUMENTS

| | | | |
|---|---|---|---|
| 9,807,359 | B1 | 10/2017 | Moule et al. |
| 10,298,910 | B1 | 5/2019 | Kroeger |
| 10,878,595 | B2 | 12/2020 | Tezaur |
| 2012/0242839 | A1 | 9/2012 | Shen |
| 2017/0345136 | A1* | 11/2017 | Van der Auwera ..... G06T 5/006 |
| 2018/0336704 | A1 | 11/2018 | Javan Roshtkhari et al. |
| 2019/0236805 | A1 | 8/2019 | Mou et al. |
| 2021/0195163 | A1* | 6/2021 | Oh ......................... H04N 19/46 |

OTHER PUBLICATIONS

Davide Scaramuzza, "OCamCalib: Omnidirectional Camera Calibration Toolbox for Matlab," University of Zurich, Robotics Swiss National Centre of Competence in Research? https://sites.google.com/site/scarabotix/ocamcalib-toolbox retrieved Dec. 27, 2018, 39 pages.

Matlab Documentation "Estimate Fisheye Parameters," https://www.mathworks.com/help/vision/ref/estimatefisheyeparameters.html. retrieved Dec. 27, 2018, 5 pages.

Urban et al., "Improved Wide-Angle, Fisheye and Omnidirectional Camera Calibration" ISPRS Journal of Photogrammetry and Remote Sensing, vol. 108, Oct. 2015, pp. 72-79. 21 pages.

Kanala et al., "A Generic Camera Model and Calibration Method for Conventional Wide-Angle and Fish-Eye Lenses" IEEE Transitions on Pattern Analysis and Machine Intelligence, vol. 28, No. 8, Aug. 2006. 15 pages.

Frank et al., "Camera Calibration for Miniature, Low Cost, Wide-Angle Imaging Systems" Conference: Proceedings of the British Machine Vision Conference 2007, University of Warwick, UK, Sep. 10-13, 2007. 10 pages.

Scaramuzza et al., "A Toolbox for Easily Calibrating Omindirectional Cameras" 2006 IEEE/RSJ International Conference on Intelligent Robots and Systems Proceedings. Oct. 2006. 8 pages.

United States Patent Patent and Trademark Office, "Non-Final Office Action," issued in connection with U.S. Appl. No. 16/143,880, dated Nov. 18, 2019, 18 pages.

United States Patent Patent and Trademark Office, "Final Office Action," issued in connection with U.S. Appl. No. 16/143,880, dated May 29, 2020, 11 pages.

United States Patent Patent and Trademark Office, "Notice of Allowance and Fee(s) Due," issued in connection with U.S. Appl. No. 16/143,880, dated Aug. 20, 2020, 7 pages.

* cited by examiner

200

400

500A

800A

800B

DUAL MODEL FOR FISHEYE LENS DISTORTION AND AN ALGORITHM FOR CALIBRATING MODEL PARAMETERS

CROSS REFERENCE TO RELATED APPLICATIONS

This patent arises from a continuation of U.S. patent application Ser. No. 16/143,880 (now U.S. Pat. No. 10,878, 595), which was filed on Sep. 27, 2018, and which claims the benefit of the filing date of U.S. Provisional Patent Application No. 62/692,937, which was filed on Jul. 2, 2018. U.S. patent application Ser. No. 16/143,880 and U.S. Provisional Patent Application No. 62/692,937 are incorporated herein by reference in their entireties. Priority to U.S. patent application Ser. No. 16/143,880 and U.S. Provisional Patent Application No. 62/692,937 is claimed.

BACKGROUND

A fisheye camera is a camera that includes a wide-angle lens that produces a strong visual distortion intended to create a wide panoramic or hemispherical image. Fisheye lenses may be used to capture ultra-wide angles of view.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

With the advance of computational imaging and computer vision, fisheye lenses are becoming more and more ubiquitous. Their use is increasingly popular for automotive applications, security surveillance, 360 video capture, etc., where their extremely wide field of view is very useful. In past their use was limited by the large image distortion that they cause. But, as image data processing is becoming faster and cheaper, this is obstacle is disappearing.

Computer vision and computational imaging applications require the ability to map points in captured 2D images to light rays and/or points in 3D world and vice versa. In order to be able to do that, it is necessary to be able to accurately calibrate the camera lens system. The models and algorithms used for regular cameras are, generally, unsuitable for the fisheye cameras, as they cannot handle a field of view that can exceed 180° and the large geometric distortion associated with such a large field of view.

In recent years, a number of models and calibration methods have been proposed for fisheye and other omnidirectional cameras. However, their accuracy and computational efficiency remain to be an issue. Currently, to characterize the radial distortion of the image, the most successful omnidirectional camera calibration tools use a polynomial that determines the coordinates of a 3D point corresponding to a 2D image point.

This polynomial based model suffers some problems that have a negative impact on both the accuracy of calibration and the computational efficiency (of the calibration process itself as well as of many of the applications using the calibration results). In particular, the lens radial distortion model typically used is inefficient for mapping 3D world points to points in 2D captured image. Additionally, the choice of polynomial coefficients representing the distortion is suboptimal for calibration accuracy. Moreover, the affine transform comprising the 2×2 stretch matrix and the distortion center cannot fully compensate for the lens-sensor misalignment. Further, the stretch matrix includes a redundant parameter that can negatively impact the convergence of the calibration process and the extrinsic calibration of multi-camera systems.

Figure 4:
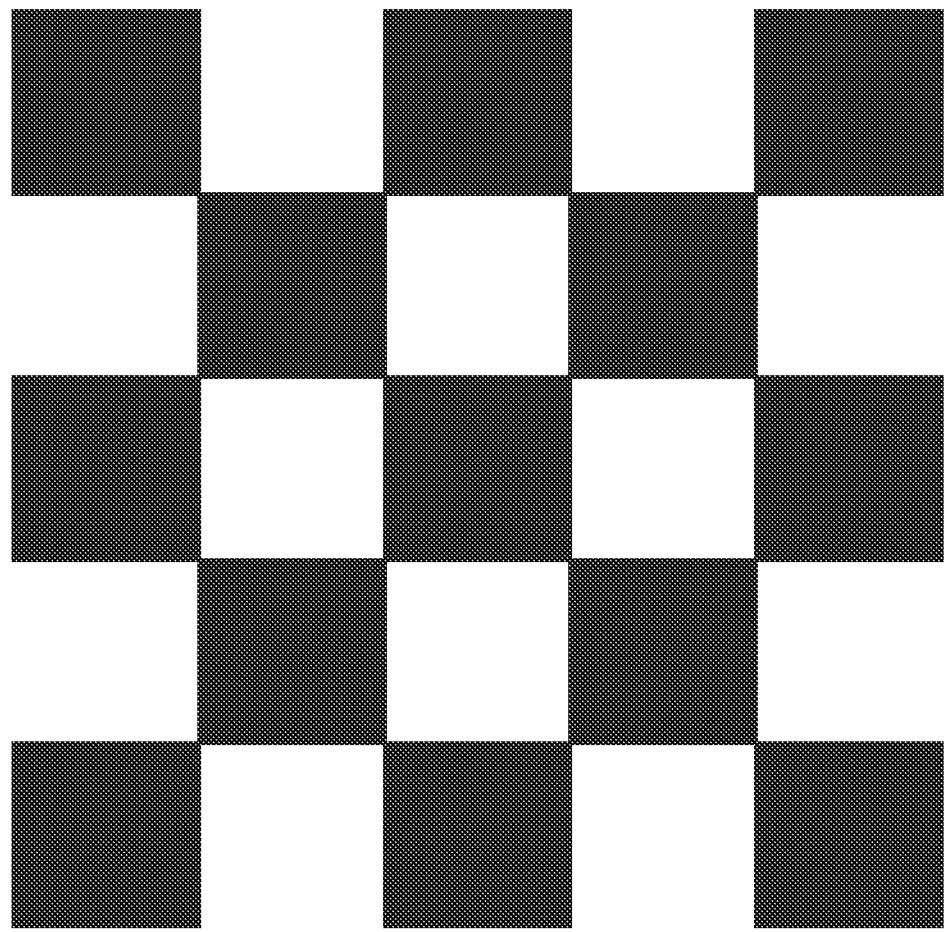
FIG. 4 is an illustration a checkerboard template.

To estimate parameters of the polynomial used to characterize a radial distortion of the image, a calibration tool requires a sequence of images of a checkerboard calibration chart, such as the chart in FIG. 4. The detected chart corner points are used to estimate the parameters characterizing the camera. The estimated camera intrinsic parameters include the position of the center of the radial distortion in the captured images, the elements of a stretch matrix that can help to compensate for some manufacturing imperfections, and the coefficients of a polynomial that is used to model the lens distortion. The algorithm also produces extrinsic parameters that characterize the position of the camera with respect to each calibration chart position.

The present disclosure relates generally to techniques that enable a dual model for fisheye lens distortion and an algorithm for calibrating model parameters. The dual distortion model includes both of an inverse distortion polynomial and an alternative distortion polynomial with coefficients selected as described below. The presented fisheye calibration techniques use the dual distortion model, which is efficient both for mapping two-dimensional (2D) image points to the three-dimensional (3D) world and from the 3D world to 2D image points. However, the model includes some further modifications to the underlying image formation model that eliminate the other mentioned disadvantages.

While a checkerboard calibration chart has been illustrated, some embodiments may not use images of checkerboard calibration chart. For example, other implementations may use images of a different chart or a special calibration device (e.g., calibration wand with LEDs), or they could use general images that do not include any calibration chart or special devices. Thus, offline calibration may be performed via a general calibration chart or another device, such as a calibration device. The dual fisheye model could be used, for example, for a dynamic calibration implementation, which directly uses the fisheye images that need to be processed by some application. Thus, the present techniques include off-line calibration (e.g. with the checkerboard) and a dynamic calibration case.

Figure 1:
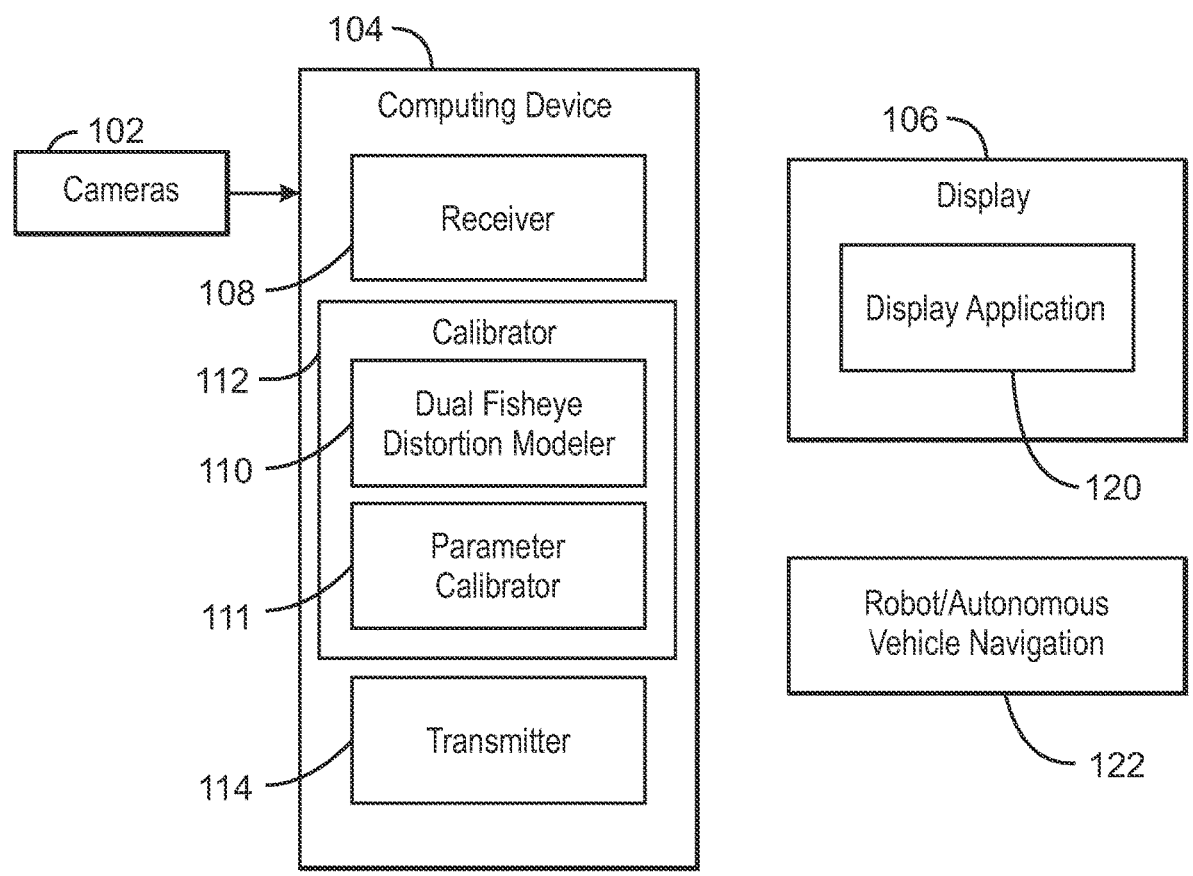
FIG. 1 is a block diagram illustrating an example system for enabling a dual fisheye model and calibrator.

FIG. 1 is a block diagram illustrating an example system for a dual model for fisheye lens distortion and an algorithm for calibrating model parameters. The example system is referred to generally by the reference number 100 and can be implemented in the computing device 600 below in FIG. 6 using the method 500 of FIG. 5 below.

The example system 100 includes a plurality of cameras 102, a computing device 104, and a display 106. The computing device 104 includes a receiver 108, a dual fisheye distortion modeler 110, a calibrator 112, and a transmitter 114. The display 106 includes a display application 120.

Figure 2:
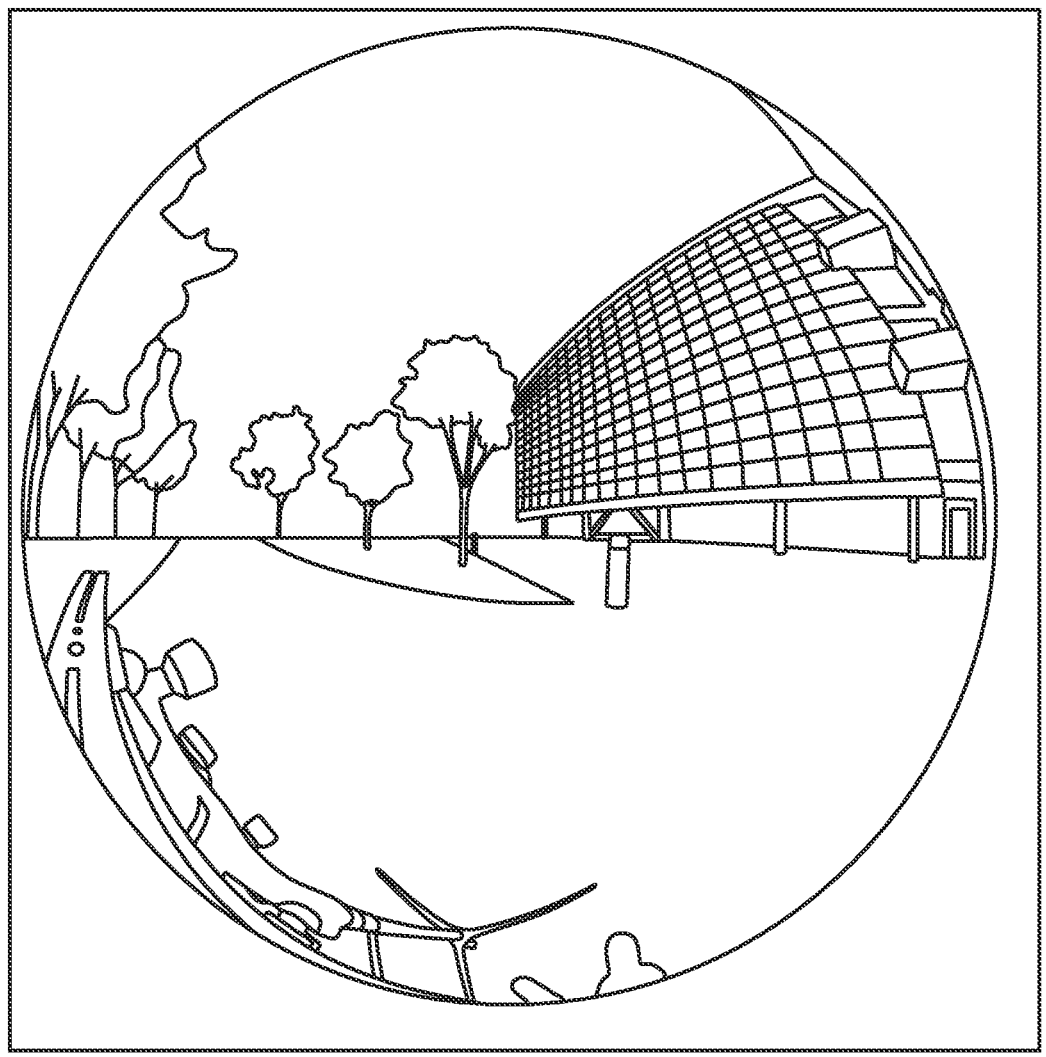
FIG. 2 is a fisheye image.

As shown in FIG. 1, a plurality of cameras 102 may capture images or video. Each camera may be a fisheye camera. As used herein, a fisheye camera is a camera that includes a wide-angle lens that produces strong visual distortion intended to create a wide panoramic or hemispherical image. The fisheye camera may capture an image such as the image 200 of FIG. 2.

In embodiments, there are one or more cameras that feed the calibration images to the calibrator 112. However, the calibrator does not need to be connected to a display application. The calibrator 112 produces the calibration parameters (dual distortion model coefficients, camera intrinsic parameters, and in the case of multiple cameras also the extrinsic parameters that characterize their mutual position) and these coefficients are fed to a separate system that involves cameras that have been calibrated, a computing device that hosts the application that processes the captured images, and possibly also a display. The display, however, is optional, as the fisheye images can be used, for example, for robot/autonomous vehicle navigation 122, in which case the calibration parameters are not used to produce some rectified or combined images to display, but they are used to find the position of the robot/vehicle and other objects in the scene. Thus, the calibration parameters can be used to find the position of a robot or vehicle including the computing device 104. The computing device 104 may also be used to find the position of objects within the scene in real time.

In the case of dynamic calibration, when the images that are to be processed are also used for the calibration, the calibrator and the application that uses the calibration reside within the same computing device, to which a display may or may not be attached. Similarly, as above, the goal may not be to produce some images that need to be displayed, but, e.g., to find the spatial position of objects in the scene and use it for navigation.

The computing device 104 may receive images from the cameras 102 and output images that are modeled according to the dual camera model and calibration parameters described herein. The receiver 108 may receive the plurality of images and send the plurality of images to a calibrator 112. The calibrator 112 may include a dual fisheye distortion modeler 110 and a parameter calculator 111. As described herein, the terms calibrator and calibration module may be used interchangeably. The dual fisheye distortion modeler 110 may approximate the fisheye distortion via a dual fisheye distortion model that includes each of a generic Taylor polynomial and an alternative fisheye radial distortion model as described below. Further, as described below the modeler 110 may generate the coefficients of the dual polynomials in parallel or simultaneously. In examples, the polynomial $g(\omega)$ described below is used whenever a point is to be projected from the 3D space to the 2D fisheye image, while the inverse distortion polynomial $f(\rho)$, similar to that used in a conventional fisheye model, is used whenever it is necessary to identify the incident ray and/or some point in the 3D scene corresponding to a given point in the 2D fisheye image. Thus, the inverse distortion polynomial $f(\rho)$ is used whenever a point is projected from the 2D fisheye image to the 3D space.

The parameter calculator 111 may calculate any additional parameters to be applied to a model of the fisheye camera. These parameters are calculated in parallel and simultaneously with the coefficients of the dual fisheye distortion modeler polynomials. Intrinsic parameters may include the parameters intrinsic to the camera itself, such as parameters related to sensor geometry and alignment. In some cases, the parameters may include any remaining intrinsic parameters that are not calculated when the coefficients of the dual fisheye distortion polynomials are generated. These parameters may be, for example, a center of distortion, affine parameters, and projective parameters. In embodiments, a six-parameter projective transform may be used to accurately model the projection onto a tilted sensor. In some examples, a checkerboard may be used to perform intrinsic calibration. The parameter calculator may also calculate extrinsic parameters such as rotation and translation of a chart with respect to the camera for each calibration image.

Figure 3:
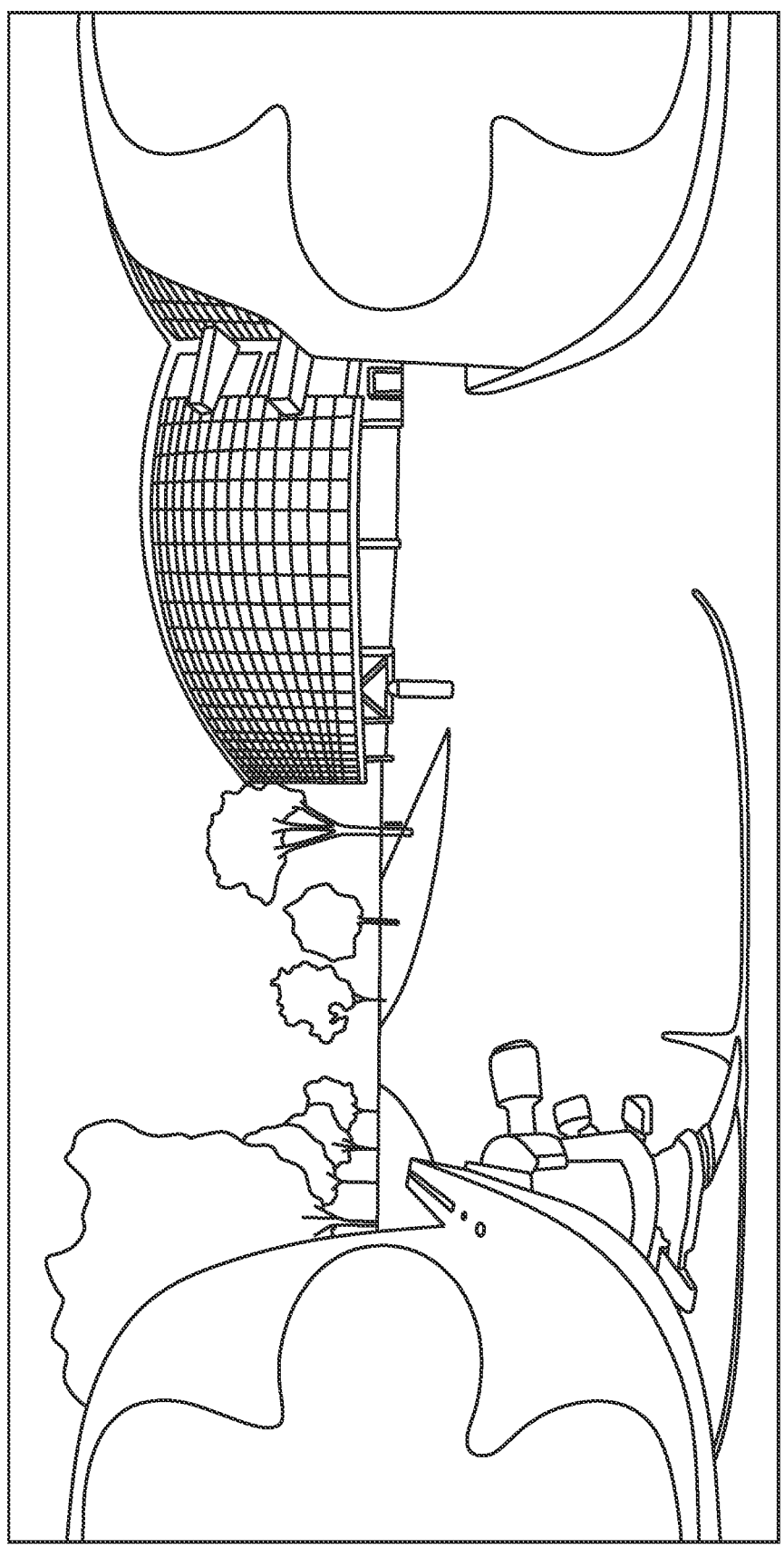
FIG. 3 is an illustration of the projection of the fisheye image.

Thus, the calibrator 112 may be used to calibrate each of the dual fisheye distortion models simultaneously. Both of these polynomials are approximations of the real lens distortion, by calibrating both polynomials the coefficients are ensured to be optimized and match the real lens distortion rather than forcing one polynomial to match the other polynomial, which includes some approximation error. Here, the undesirable matching of the error and biasing one of these models to be more accurate is avoided. The transmitter 114 may then transmit calibration, and any needed projections to a display application 120 of the display 106. For example, the image 300 of FIG. 3 may be a projection from the fisheye image 200 of FIG. 2. The image 300 is computed by the display application 120 using the images captured by the cameras. In embodiments, an image capture model is a model of the image formation of a camera sensor, which may be represented by a projective transform. The dual fisheye model is a central projection with radial distortion, which is characterized by two polynomials as described below. An overall camera model may include both the dual fisheye model and the image capture model.

In some cases, a robot or autonomous vehicle navigation system 122 includes the computing device 104. In such an embodiment, the output of the dual fisheye distortion modeler 110 and calibrator 112 may be used to derive the position of objects in a scene. The output of the dual fisheye distortion modeler 110 and calibrator 112 may also be used to derive the position of the robot or autonomous vehicle system within an environment.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, computing devices, components, head mounted displays, etc.).

The present techniques can generate a more accurate calibration via a choice of powers in the dual fisheye distortion model. In particular, a first polynomial of the dual fisheye distortion model may be modified to use even powers. To further improve the calibration accuracy, the fisheye distortion model used for the mapping from the ideal image plane to the actual sensor pixel array may be modified. In particular, the typical affine transform may be replaced with a projective transform as described below.

Finally, in a non-linear optimization (bundle adjustment) stage the coefficients of both of these polynomials may be calibrated simultaneously.

The mapping between points in 3D space and the points in the captured image can be split to two phases. First, mapping from a 3D space to the ideal image plane and second, mapping from the ideal image plane to the image sensor plane. The typical model assumes that the first mapping is a central projection with radial distortion. To characterize the radial distortion, the typical model uses a polynomial of degree four:

$$f(\rho) = f_0 + f_2\rho^2 + f_3\rho^3 + f_4\rho^4$$

For any given point (x,y) in the ideal image plane (i.e., for any given refracted ray), this polynomial makes it possible to find the corresponding incident ray by providing a point in 3D space that the ray passes through: (x,y,f($\rho$)), where $\rho = \sqrt{x^2+y^2}$. Note that there are only four parameters in this model, as the linear term is skipped.

While this model is efficient for finding the incident ray that corresponds to the given image point, it is cumbersome when it comes to finding the image point corresponding to a given point in the 3D scene. The projection of point $(\tilde{x},\tilde{y},\tilde{z})$ in the ideal image plane is the point (x,y) such that:

$$s(\tilde{x},\tilde{y},\tilde{z}) = (x,y,f(\rho))$$

for some scaling factor s>0 and $\rho = \sqrt{x^2+y^2}$. This means that:

$$x = s\tilde{x},\ y = s\tilde{y}$$

and:

$$s = \frac{\rho}{\tilde{\rho}},$$

where $\tilde{\rho} = \sqrt{\tilde{x}^2+\tilde{y}^2}$. However, to compute s, it is necessary first to find $\rho$. This can be achieved by exploiting the relationship between the z-components:

$$z = f(\rho) = s$$
$$\tilde{z} = \frac{\rho}{\tilde{\rho}}\tilde{z},$$

which yields $$f_0 + \frac{\tilde{z}}{\tilde{\rho}}\rho + f_2\rho^2 + f_3\rho^3 + f_4\rho^4 = 0.$$

To find the image point corresponding to the given 3D scene point, the root of a polynomial of degree 4 is found, which is computationally expensive.

For the mapping between the ideal image plane (which is perpendicular to the optical axis and is equipped with the xy-coordinate system that has origin at the principal point, where the optical axis intersects the plane) and the captured image (using pixel coordinates with the origin in the upper left corner of the image) the typical model uses a 2D affine transform. For the given point (x,y) in the ideal image plane the corresponding image point is (u, v), $$\begin{pmatrix}u\\v\end{pmatrix} = \begin{pmatrix}s_{11} & s_{12}\\s_{21} & 1\end{pmatrix}\begin{pmatrix}x\\y\end{pmatrix} + \begin{pmatrix}c_1\\c_2\end{pmatrix}.$$

Here, $(c_u, c_v)$ is the center of the radial distortion in the image (point on the optical axis). The affine transform matrix (the stretch matrix) has only three parameters, as one of the diagonal entries can always be normalized to 1. The coefficients of the stretch matrix are determined only up to scale (thus allowing the above-mentioned normalization). The scaling of the stretch matrix coefficients can be seen as either changing the scale on the x- and y-axis in the ideal image plane or changing the distance of the ideal image plane from the optical center (the center of projection). Either way, the different scaling of the stretch matrix corresponds to scaling the radial distance $\rho$ in the ideal image plane and can be absorbed by adjusting the distortion polynomial coefficients in the appropriate manner.

The calibration of the fisheye model involves two stages. First, the initial values of the parameters are estimated using a direct method and second, this initial estimate is improved by iterative non-linear optimization (bundle adjustment). The parameters to be estimated include the intrinsic parameters listed above—$f_0$, $f_2$, $f_3$, $f_4$, $c_1$, $c_2$, $s_{11}$, $s_{12}$, and $s_{21}$, and a 3D rotation matrix $R_j$ (which can be parameterized by three parameters) and translation vector $t_j$ for each calibration image. The described algorithm for the calibration should be seen only as one embodiment. Other embodiments may, for example, use only direct estimation of the parameters and not include the iterative non-linear optimization step, or use some different cost function for the non-linear optimization step. For example, the cost function may be sine-based.

To obtain an initial estimate for the calibration, it is assumed that the center of distortion $(c_1,c_2)$ is in the center of the image and that the stretch matrix is a 2×2 identity matrix. This enables finding a point in the ideal image plane, (x,y), for each chart corner point detected in the captured calibration images, (u,v). The equations that need to be solved to find the distortion polynomial coefficients and the entries of the rotation matrices and translations vectors are derived using the fact that vectors $(x,y,f(\rho))^T$ and $R_j(\tilde{x},\tilde{y},0)^T + t_j$ (representing the actual point on the calibration chart expressed in the camera coordinate system) are parallel and thus their cross product is equal to zero.

The subsequent non-linear bundle adjustment optimizes all parameters by minimizing the total square re-projection error:

$$\sum_{j,k}(u_{j,k} - \tilde{u}_{j,k})^2 + (v_{j,k} - \tilde{v}_{j,k})^2$$

where $(u_{j,k}, v_{j,k})$ is the j-th corner point detected in the k-th calibration image, and $(\tilde{u}_{j,k}, \tilde{v}_{j,k})$ is the actual j-th chart corner point projected to the 2D image using the estimated intrinsic parameters and the rotation and translation for the k-th calibration image.

In practice, the direct optimization of all the parameters by a non-linear least squares method using the initial calibration as the starting point may not produce the desired results and some additional steps yield a better starting point for the final bundle adjustment to obtain sufficiently accurate calibration. For example, the typical model includes an additional step before the non-linear optimization stage which improves the estimate of the distortion center by a brute force search. This step is not necessary when a slightly modified non-linear optimization cost function is used. However, some additional steps may be done to guarantee the convergence to a good local minimum. While the brute force search for better estimate of the center of distortion was unnecessary, the non-linear optimization is split into two stages, initially keeping the stretch matrix set to the identity matrix, in order for the algorithm to converge and produce good calibration.

The set of intrinsic parameters for the typical model is not minimal. One of the parameters is redundant and can be eliminated. With all the parameters present, the same mapping between points in 3D space and in the 2D fisheye image can be represented by infinitely many different combinations of the parameter values. This is because a virtual camera coordinate system may be arbitrarily rotated about the optical axis, and compensation for this rotation may be done by appropriately modifying the chart-to-camera rotations. The results of typical intrinsic calibration may include an unnecessary small rotation between the ideal image plane and sensor coordinates of about one degree (1°). While this is not an issue when calibrating a single camera (since this rotation is fully compensated for by the extrinsic rotation), when calibrating a camera array this may falsely indicate that the cameras are not aligned as they should be. Moreover, the redundant parameter negatively impacts the convergence of non-linear optimization.

To eliminate the arbitrary rotation between the ideal image plane coordinates and the sensor (captured image) coordinates, the selection, for example, of $s_{12}=0$ (which corresponds to requiring that the image of the horizontal axis of the camera coordinate system in the captured image is horizontal on the sensor) can be made. After constraining the parameter $s_{12}$ to 0, the bundle adjustment of all remaining parameters directly produces a good calibration and it is no longer necessary to split the calibration into two stages, with the first stage leaving out the stretch matrix elements from the optimization. Thus, during a direct estimation of the dual polynomial coefficients, the image of the horizontal axis of the camera coordinate system in the captured image is horizontal and stretch matrix elements are not used.

The fisheye lens design, in general, attempts to follow some common distortion model. This model may be an equidistant model, in which the image point height is proportional to the incident angle, $\rho=f\omega$, or a stereographic model, in which $\rho=2f\tan(\omega/2)$. However, the actual lens design inevitably does not match the model perfectly and using a model with a single parameter f (lens focal length) does not produce an accurate enough lens calibration. The function of the incident angle in these distortion models may be replaced by a Taylor expansion, and the coefficients of the Taylor polynomial are calibrated. Since the functions representing the distortion are always odd, only the odd degree coefficients of the Taylor expansion are non-zero and are calibrated as follows:

$$\rho = g(\omega) = \sum_{n=0}^{N} g_n \omega^{2n+1}.$$

The advantage of this second, alternative fisheye radial distortion model is that the projection of the 3D scene point to the 2D fisheye image can be computed efficiently. Unlike the typical distortion model, finding an image point height $\rho$ only requires evaluating the polynomial, not finding its roots. However, this model makes it more complicated to map the points in the opposite direction, from the 2D fisheye image to the incident rays and/or points in the 3D scene, as solving for the incident angle requires finding the root of a polynomial, typically of degree 5 or higher.

To improve the computational efficiency, both of the calibration process and of the applications using the resulting camera calibration, the first and second distortion models are combined to find a dual fisheye distortion model. The dual fisheye model uses the first and second distortion models simultaneously. The calibration process finds the coefficients of each of these polynomials in parallel. The polynomial $g(\omega)$ described above is used whenever a point needs to be projected from the 3D space to the 2D fisheye image, while the inverse distortion polynomial $f(\rho)$, similar to a typical fisheye model, is used whenever it is necessary to identify the incident ray and/or some point in the 3D scene corresponding to a given point in the 2D fisheye image.

The polynomial $f(\rho)$ as described according to the present techniques differs from that used in typical fisheye modeling. While the typical fisheye models use the following:

$$f(\rho)=f_0+f_2\rho^2+f_3\rho^3+f_4\rho^4,$$

the present techniques use even powers:

$$f(\rho) = \sum_{m=0}^{M} f_m \rho^{2m}.$$

In embodiments, f can be viewed as the function of two variables, x and y, that is radially symmetric. Requiring the linear term coefficient $f_1$ to be zero in the typical model prevents the first derivative of f from being discontinuous at zero. This argument can be extended to higher order derivatives. In order to make also all the higher order derivatives continuous, $f(\rho)$ should be an even function, where all odd degree coefficients of $f(\rho)$ are zero. Similarly, as in the typical model, $f(\rho)$ may be used with four parameters that are optimized. According to the present techniques, it is assumed that:

$$f(\rho)=f_0+f_1\rho^2+f_2\rho^4+f_3\rho^6.$$

This choice of powers yields a more accurate calibration than the one used by typical models. To further improve the calibration accuracy, the model used for the mapping from the ideal image plane to the actual sensor pixel array may also be modified. In practice, due to the manufacturing tolerances, the optical elements and the sensor may not be perfectly aligned. The affine model used by typical models can compensate for the sensor being shifted with respect to the lens, i.e., for not having the center of distortion exactly in the center of the image. However, the affine model of the typical model is not able to fully compensate for the sensor not being perfectly perpendicular to the optical axis. Thus, the affine transform in of the typical model is replaced with a projective transform, as it can accurately model the projection onto a tilted sensor.

While the projective transform has, in general, eight degrees of freedom, using eight parameters would lead to a redundant parameterization. It can be shown that only six parameters are needed and the homography matrix representing the projective transform from the ideal image plane to the sensor (or the captured image) can be expressed as:

$$H = \begin{pmatrix} 1 & 0 & c_1 \\ 0 & 1 & c_2 \\ 0 & 0 & 1 \end{pmatrix} \begin{pmatrix} 1 & 0 & 0 \\ 0 & 1 & 0 \\ p_1 & p_2 & 1 \end{pmatrix} \begin{pmatrix} a_1 & a_2 & 0 \\ 0 & 1 & 0 \\ 0 & 0 & 1 \end{pmatrix}$$

Here, $(c_1, c_2)$ are the coordinates of the distortion center in the captured images, $p_1$ and $p_2$ are new projective parameters, and $a_1$ and $a_2$ are affine parameters. Factoring the homography matrix in this manner is advantageous for several reasons. Most importantly, it enables efficient implementation of both the projective transform from the ideal image plane to the sensor pixel array and its inverse, since the homography matrix representing the inverse transform is:

$$H^{-1} = \begin{pmatrix} 1/a_1 & -a_2/a_1 & 0 \\ 0 & 1 & 0 \\ 0 & 0 & 1 \end{pmatrix} \begin{pmatrix} 1 & 0 & 0 \\ 0 & 1 & 0 \\ -p_1 & -p_2 & 1 \end{pmatrix} \begin{pmatrix} 1 & 0 & -c_1 \\ 0 & 1 & -c_2 \\ 0 & 0 & 1 \end{pmatrix}$$

Another advantage is that this representation makes it possible to easily switch between the projective model and the affine model. While the affine model is less accurate, sometimes it can be preferred in practice, because unlike the projective transform, affine transform does not require divisions which can be expensive to implement. To produce a calibration that uses an affine transform only, the projective parameters $p_1$ and $p_2$ are set to zero. The affine parameters $a_1$ and $a_2$ are equivalent to the typical model stretch matrix elements $s_{11}$ and $s_{12}$.

While it would be possible to use the typical algorithm to calibrate one of the dual polynomials and then to match the other polynomial to the calibrated polynomial by performing a least-squares fit, such an approach is prone to an undesirable matching of the error in the calibrated polynomial as well as biasing of the polynomial. In embodiments, a first polynomial may be matched to a second polynomial is calculate an initial estimate, but in the non-linear optimization (bundle adjustment) stage the coefficients of both polynomials are calibrated simultaneously. In this case, both polynomials are approximations of the real lens distortion, and calibrating both ensures that the coefficients are optimized to match the real lens distortion rather than forcing one of them only to match the other polynomial, which includes some approximation error. In this manner, the undesirable matching of the error and biasing one of these models to be more accurate is avoided.

One embodiment of the cost function that is used for bundle adjustment has three parts: First, a reprojection error of projecting the chart corner points from 3D to the fisheye images. Second, an angle error of the projected incident rays corresponding to the chart corner points detected in the 2D fisheye images. Finally, a reprojection error of projecting the detected chart corner points to incident rays in 3D and from there back to 2D fisheye image.

The following cost function is minimized:

$$\alpha_1 \sum_{j,k} \|u_{j,k} - \tilde{u}_{j,k}\|^2 + \alpha_2 \sum_{j,k} \mathrm{acos}^2(x_{j,k}^T \tilde{x}_{jk}) + \alpha_3 \sum_{j,k} \|u_{j,k} - \hat{u}_{j,k}\|^2$$

Alternatively, the cost function may use the sine of the angle (instead of the angle between rays):

$$\alpha_1 \sum_{j,k} \|u_{j,k} - \tilde{u}_{j,k}\|^2 + \alpha_2 \sum_{j,k} \left(1 - (x_{j,k}^T \tilde{x}_{jk})^2\right) + \alpha_3 \sum_{j,k} \|u_{j,k} - \hat{u}_{j,k}\|^2$$

Here, variable $u_{j,k}$ is the j-th chart corner point detected in the k-th calibration image. Variable $x_{j,k}$ is the point on incident ray corresponding to this point (computed with the current estimate of the camera intrinsic parameters), normalized to lie on the unit sphere, $\|x_{j,k}\|=1$. Variable $\hat{u}_{j,k}$ is $x_{j,k}$ projected back to the fisheye image (using the current estimate of the camera intrinsic parameters). Variable $\tilde{x}_{jk}$ is the j-th corner point of the calibration chart placed in the position depicted in the k-th calibration image, expressed in the camera coordinate system (using the current estimate of the camera to chart extrinsic parameters), normalized to lie on the unit sphere, $\|\tilde{x}_{jk}\|=1$. Variable $\tilde{u}_{j,k}$ is $\tilde{x}_{jk}$ projected to the fisheye image (using the current estimate of the camera intrinsic parameters). Finally, variables $\alpha_1$, $\alpha_2$, and $\alpha_3$ are the weights that can be tuned to balance the contributions of the three parts of the cost function.

Each of the three components of the cost function has its own purpose. Computing the first component involves projecting points from 3D to the fisheye images, which employs the values of the coefficients of the distortion polynomial $g(\omega)$. This term is used to optimize the parameters $g_m$, $m=0, \ldots, M$. Evaluating the second term involves finding points $x_{j,k}$ that determine the incident rays in 3D which correspond to the detected corner points in the fisheye images. This requires using the inverse distortion polynomial $f(\rho)$ and thus it is used to optimize its parameters, $f_n$, $n=0, \ldots, N$. Finally, evaluating the last term ensures that at the parameters $g_m$, $m=0, \ldots, M$ and the parameters $f_n$, $n=0, \ldots, N$, for which the performance of polynomials $g(\omega)$ and $f(\rho)$ is being optimized, match such that the polynomials represent the same fisheye distortion.

To improve the robustness with respect to incorrectly detected chart corner points, the cost function can be used with errors weighted according to the estimated reliability of each point as follows:

$$\alpha_1 \sum_{j,k} w_{j,k}^2 \|u_{j,k} - \tilde{u}_{j,k}\|^2 + \alpha_2 \sum_{j,k} w_{j,k}^2 \mathrm{acos}^2(x_{j,k}^T \tilde{x}_{jk}) + \alpha_3 \sum_{j,k} w_{j,k}^2 \|u_{j,k} - \hat{u}_{j,k}\|^2$$

Or, alternatively, $$\alpha_1 \sum_{j,k} w_{j,k}^2 \|u_{j,k} - \tilde{u}_{j,k}\|^2 +$$
$$\alpha_2 \sum_{j,k} w_{j,k}^2 \left(1 - (x_{j,k}^T \tilde{x}_{jk})^2\right) + \alpha_3 \sum_{j,k} w_{j,k}^2 \|u_{j,k} - \hat{u}_{j,k}\|^2$$

The weights $w_{j,k}$ can be set, for example, as $$w_{j,k} = \min(1, \|u_{j,k} - \tilde{u}_{j,k}\|^{-2})$$

where $\tilde{u}_{j,k}$ are reprojected chart corner points obtained with some previous values of the intrinsic and extrinsic parameters.

To get a close enough estimate of the parameter values suitable for initializing the bundle adjustment, an algorithm similar to typical model is used. However, to avoid the need for using a constrained least-squares fit when finding the inverse distortion polynomial coefficients, a step is added to the process. First, the coefficients of the inverse distortion polynomial f(ρ) are estimated up to a scale factor, using the fact that the computed incident ray points $x_{j,k}$ should be co-planar for all the chart corner points that lie on a line. Then, in the last step of the process, in which the typical model estimates these coefficients, the missing scale factor is estimated.

Figure 5A:
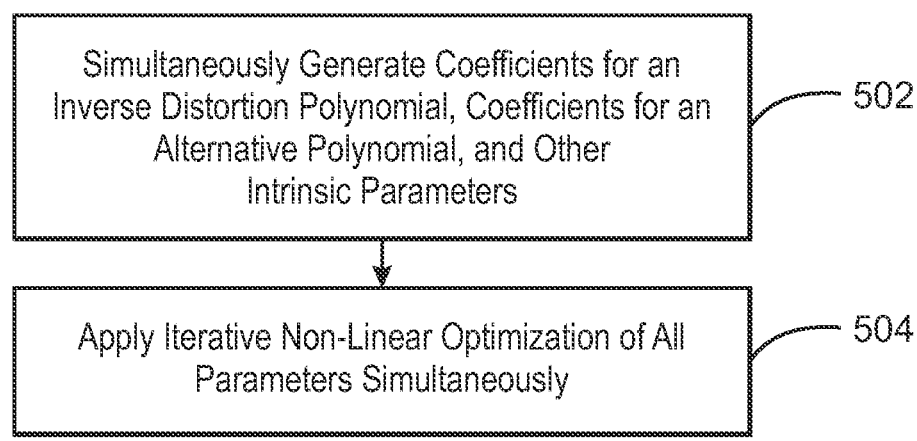
FIG. 5A is a process flow diagram illustrating a method for a dual model for fisheye lens distortion and an algorithm for calibrating model parameters via an off-line calibration.

FIG. 5A is a process flow diagram illustrating a method 500A for a dual model for fisheye lens distortion and an algorithm for calibrating model parameters via an off-line calibration. The example method is generally referred to by the reference number 500A and can be implemented using the computing device 104 of FIG. 1 above, the processor 602 of the computing device 600 of FIG. 6 below, the computer readable media 700 of FIG. 7 below, or the vehicle 800 of FIG. 8 below.

At block 502, the coefficients of an inverse distortion polynomial f(ρ), the coefficients of an alternative fisheye polynomial g(ω), and all the remaining intrinsic and extrinsic parameters are estimated by via direct estimation. Here, calibrating the dual polynomials includes simultaneously generating coefficients for the inverse distortion polynomial and the alternative polynomial. Moreover, other intrinsic parameters may be calculated in parallel with the coefficients for the inverse distortion polynomial and the alternative polynomial.

In some cases, an initial estimate for the calibration of the inverse distortion polynomial f(ρ) and the alternative fisheye polynomial g(ω) is calculated prior to calibrating the dual polynomials at block 502. The initial estimate for the calibration parameters may include dual distortion model coefficients, and the extrinsic parameters that characterize the mutual position of a camera with respect to the calibration chart. In particular, first the coefficients of the inverse distortion polynomial f(ρ) are estimated up to scale, then the extrinsic parameters are calculated with the scale for the coefficients of the inverse distortion polynomial. Finally, the coefficients of the alternative fisheye polynomial g(ω) coefficients are estimated. The other intrinsic parameters are estimated in the case of an initial estimate, and instead default values representing an ideal alignment are used. Default values include the center of distortion being in the center of the image. In an off-line calibration scenario, a particular image is captured and used to find the initial estimate of the calibration parameters. For example, a checkerboard image with known dimensions may be used to obtain the initial estimate of the calibration parameters.

At block 504, iterative non-linear optimization of all parameters is applied simultaneously. Thus, the calibration coefficients and parameters found simultaneous calibration of the dual fisheye polynomials may be iteratively optimized. In particular, the initial estimate is improved by bundle adjustment. The bundle adjustment may be a three-part bundle adjustment as described above.

Figure 5B:
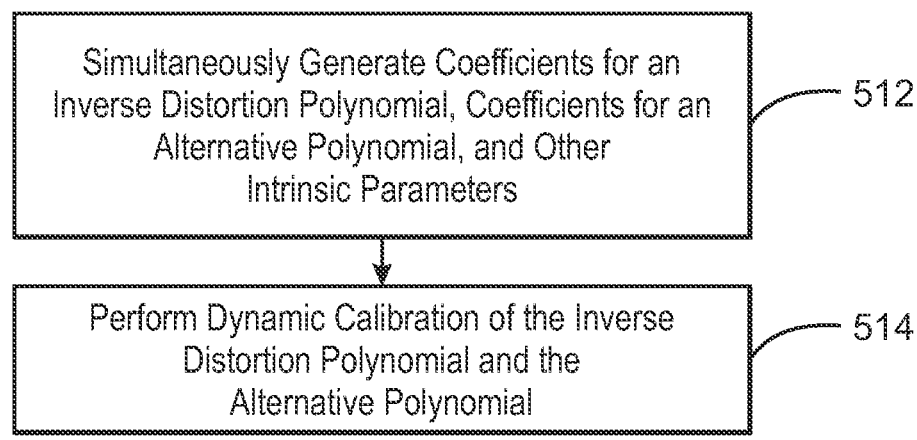
FIG. 5B is a process flow diagram illustrating a method for a dual model for fisheye lens distortion and an algorithm for calibrating model parameters via a dynamic calibration.

FIG. 5B is a process flow diagram illustrating a method 500B for a dual model for fisheye lens distortion and an algorithm for calibrating model parameters via a dynamic calibration. The example method is generally referred to by the reference number 500B and can be implemented using the computing device 104 of FIG. 1 above, the processor 602 of the computing device 600 of FIG. 6 below, the computer readable media 700 of FIG. 7 below, or the vehicle 800 of FIG. 8 below.

At block 512, the coefficients of an inverse distortion polynomial f(ρ), an alternative fisheye model g(ω), and all the remaining intrinsic and extrinsic parameters are initialized. They may represent, for example, factory calibration stored in the memory.

At block 514, dynamic calibration of coefficients of the inverse distortion polynomial, coefficients of the alternative fisheye polynomial, intrinsic parameters, and/or extrinsic parameters is performed by using key points detected in the images. Dynamic calibration is the calibration using images captured by at least one fisheye camera that are to be used by the display application or for mapping or navigation functionality. Dynamic calibration is used when the properties of the imaging system change significantly over time.

In dynamic calibration, a plurality of matching point pairs is detected in calibration images. The 3D coordinates of the corresponding points may be determined along with depth values for the detected feature points. Typically, dynamic calibration uses RANSAC method to provide robustness with respect to incorrectly matched points. In embodiments, the dynamic calibration may be updated periodically, or as necessary based on any image captured by the fisheye camera.

In FIG. 5A, any number of additional blocks not shown may be included within the example process 500A, depending on the details of the specific implementation. Similarly, in FIG. 5B, any number of additional blocks not shown may be included within the example process 500B, depending on the details of the specific implementation.

In this manner, methods 500A and 500B of FIGS. 5A and 5B enable the dual fisheye distortion model to use the alternative modified polynomial g(ω) whenever a point needs to be projected from the 3D space to the 2D fisheye image, while the modified inverse distortion polynomial f(ρ) is used whenever it is necessary to identify the incident ray and/or some point in the 3D scene corresponding to a given point in the 2D fisheye image.

Figure 6:
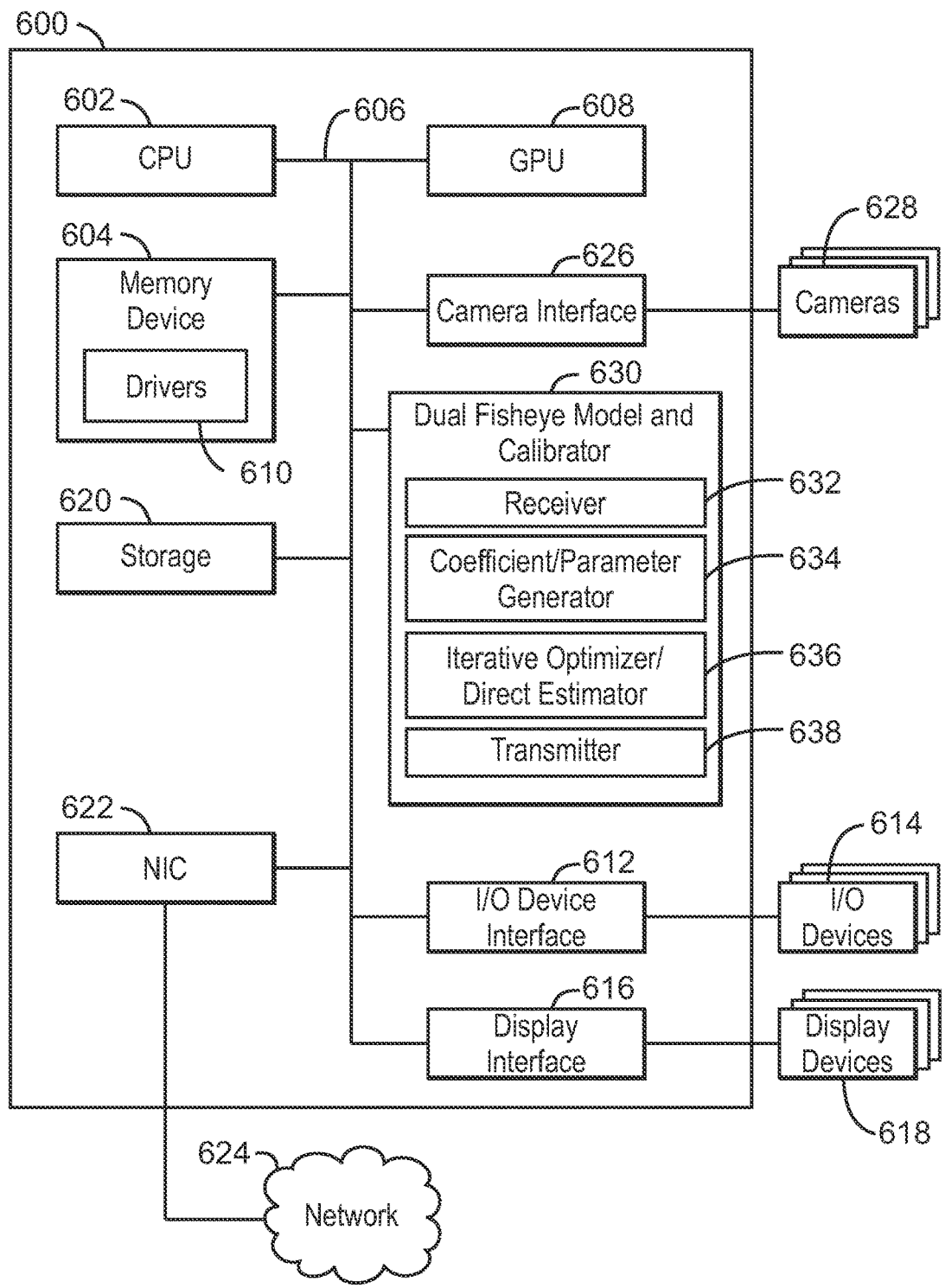
FIG. 6 a block diagram is shown illustrating an example computing device that can enable a dual fisheye model and calibrator.

Referring now to FIG. 6, a block diagram is shown illustrating an example computing device that enables a dual model for fisheye lens distortion and an algorithm for calibrating model parameters. The computing device 600 may be, for example, a laptop computer, desktop computer, tablet computer, mobile device, or wearable device, among others. In some examples, the computing device 600 may be a smart camera or a digital security surveillance camera. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random-access memory (DRAM).

The memory device 604 can include random access memory (RAM), read only memory (ROM), flash memory, or any other suitable memory systems. For example, the memory device 604 may include dynamic random-access memory (DRAM). The memory device 604 may include device drivers 610 that are configured to execute the instructions for a dual model for fisheye lens distortion and an algorithm for calibrating model parameters. The device drivers 610 may be software, an application program, application code, or the like.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random-access memory (DRAM). The memory device 604 may include device drivers 610 that are configured to execute the instructions for a dual model for fisheye lens distortion and an algorithm for calibrating model parameters. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600 or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display devices 618 may include a display screen that is a built-in component of the computing device 600. The display devices 618 may also include a computer monitor, television, or projector, among others, that is internal to or externally connected to the computing device 600. The display device 618 may also include a head mounted display. For example, the head mounted display may receive stereoscopic light field view corresponding to a particular perspective. For example, the head mounted display can detect a translation and send updated coordinates corresponding to the perspective to the receiver 632 described below.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera interface 626. For example, the camera interface 626 may be connected to a plurality of cameras 628. In some examples, the cameras 628 may include wide angle lenses, ultra-wide angle lenses, fisheye lenses, or any combination thereof.

The computing device 600 further includes a dual fisheye model and calibrator 630. For example, the dual fisheye model and calibrator 630 can be used for dual fisheye lens modeling and calibration. The dual fisheye model and calibrator 630 can include a receiver 632, coefficient/parameter generator 634, an iterative optimizer/direct estimator 636, and a transmitter 638. In some examples, each of the components 632-638 of the dual fisheye model and calibrator 630 may be a microcontroller, embedded processor, or software module. A receiver 632 may obtain camera specific values. A coefficient/parameter generator 634 may determine the coefficients of an inverse distortion polynomial $f(\rho)$ to model radial distortion. The coefficient/parameter generator 634 may also determine the coefficients of an alternative fisheye model $g(\omega)$. Finally, the coefficient/parameter generator 634 may also determine intrinsic parameters. The coefficients of the inverse distortion polynomial, the coefficients of the alternative fisheye model, and at least a portion of the intrinsic parameters are calculated simultaneously, or in parallel.

An iterative optimizer 636 may perform iterative non-linear optimization of all parameters of $f(\rho)$ and $g(\omega)$ simultaneously. A transmitter 638 may transmit the dual fisheye distortion model and calibration values as needed. The dual fisheye distortion model can use the alternative modified polynomial $g(\omega)$ whenever a point needs to be projected from the 3D space to the 2D fisheye image, while the modified inverse distortion polynomial $f(\rho)$ is used whenever it is necessary to identify the incident ray and/or some point in the 3D scene corresponding to a given point in the 2D fisheye image.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the receiver 632, coefficient/parameter generator 634, iterative optimizer 636, transmitter 638, a calibrator, or a calibration module may be partially, or entirely, implemented in hardware and/or in the processor 602. For example, the functionality may be implemented with an application specific integrated circuit, in logic implemented in the processor 602, or in any other device. For example, the functionality of the dual fisheye model and calibrator 630 may be implemented with an application specific integrated circuit, in logic implemented in a processor, in logic implemented in a specialized graphics processing unit such as the GPU 608, or in any other device.

Figure 7:
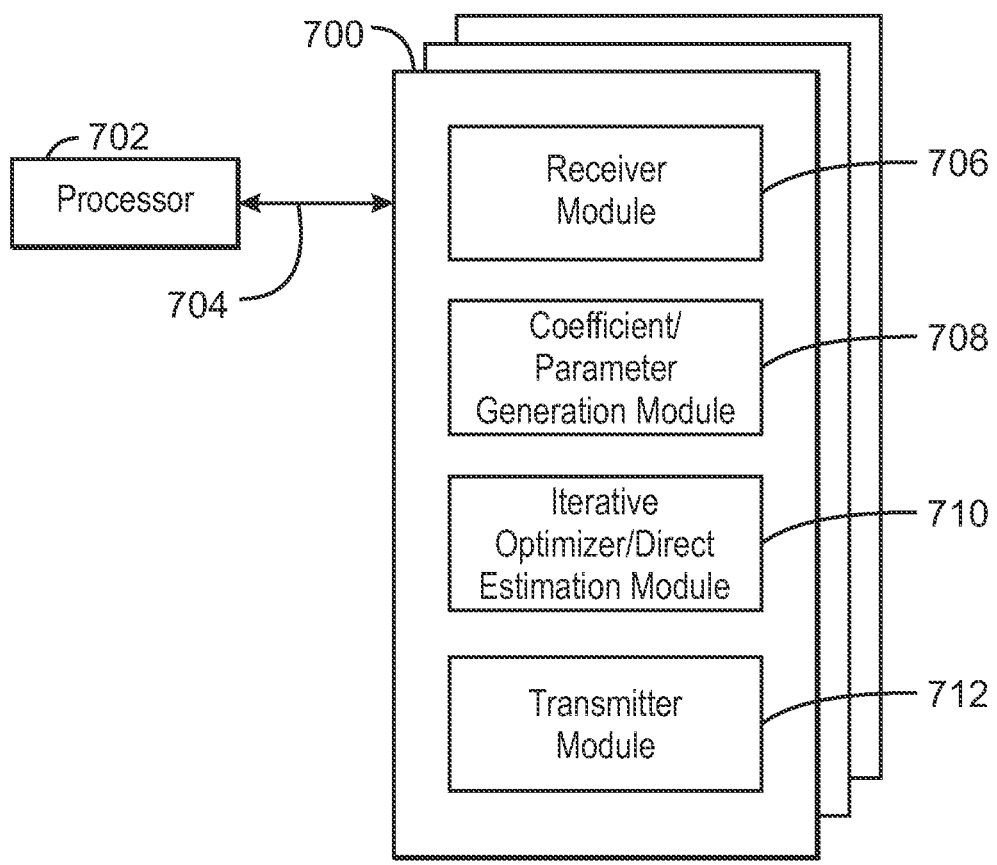
FIG. 7 is a block diagram showing computer readable media that store code for a dual fisheye model and calibrator.

FIG. 7 is a block diagram showing computer readable media 700 that store code for a dual fisheye model and calibrator. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a receiver module 706 may be configured to receive camera specific values. A coefficient/parameter generation module 708 may determine the coefficients of an inverse distortion polynomial $f(\rho)$ to model radial distortion, the coefficients of an alternative fisheye model g(ω), and intrinsic parameters. The coefficients of the inverse distortion polynomial, the coefficients of the alternative fisheye model, and at least a portion of the intrinsic parameters are calculated simultaneously, or in parallel. An iterative optimizer/direct estimation module 710 may perform iterative non-linear optimization of all parameters of f(ρ) and g(ω) simultaneously. A transmitter module 712 may transmit the dual fisheye distortion model and calibration values as needed.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

Figure 8:
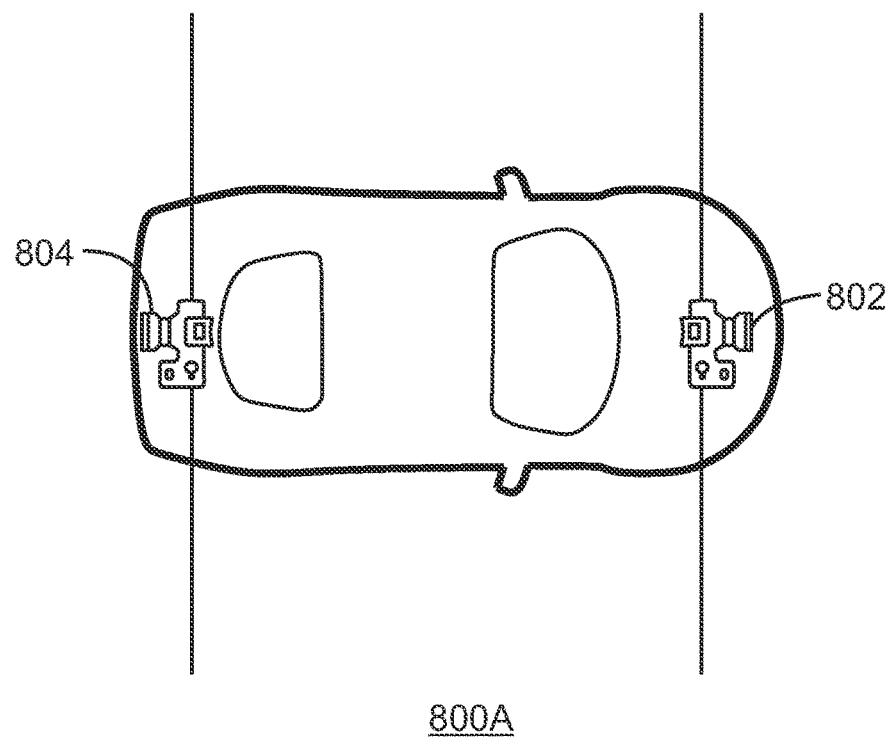
FIG. 8 is an illustration of vehicles with fisheye cameras.
Figure 8:
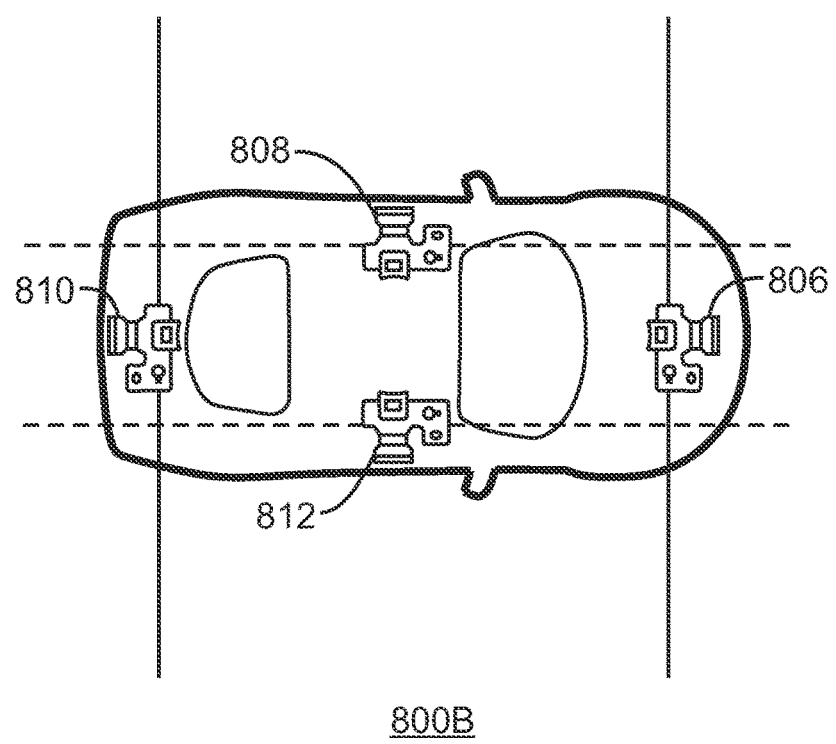

FIG. 8 is an illustration of vehicles 800A and 800B with fisheye cameras. Vehicle 800A includes two fisheye cameras 802 and 804. Vehicle 800B includes two fisheye cameras 806, 808, 810, and 812. While a particular number of cameras are illustrated, vehicles 800A and 800B may include any number of fisheye cameras, at any position along the surface, within, or underneath the vehicles 800A and 800B. Further, vehicles 800A and 800B may include system 100 for a dual model for fisheye lens distortion or the computing device 104 as described by FIG. 1. Further, the vehicles 800A and 800B are able to implement the methods 500A and 500B of FIGS. 5A and 5B, respectively.

As illustrated, vehicle 800A may capture a scene from the environment including various objects. Each of the fisheye cameras 802 and 804 can capture up to a one-hundred and eighty-degree field of view (FOV). Similarly, vehicle 800B may capture a scene from the environment including various objects. Each of the fisheye cameras 806, 808, 810, and 812 can capture up to a one hundred and eighty-degree FOV. Here, the various FOVs overlap. The present techniques enable the cameras 802, 804, 806, 808, 810, and 812 map points in captured 2D images to light rays and/or points in 3D world and vice versa via efficient camera calibration. The calibration enables the vehicles to quickly determine their location within an environment.

Example 1 is a system for enabling a dual fisheye model and calibration. The system includes a calibration module that is at least partially hardware, to simultaneously generate a first set of coefficients of an inverse distortion polynomial representing radial distortion and a second set of coefficients of an alternative distortion polynomial.

Example 2 includes the system of example 1, including or excluding optional features. In this example, the first set of coefficients and the second set of coefficients are optimized via an iterative non-linear optimization.

Example 3 includes the system of any one of examples 1 to 2, including or excluding optional features. In this example, the first set of coefficients and the second set of coefficients are generated via a direct estimation.

Example 4 includes the system of any one of examples 1 to 3, including or excluding optional features. In this example, the calibration module enables offline calibration with a calibration chart or another device.

Example 5 includes the system of any one of examples 1 to 4, including or excluding optional features. In this example, the calibration module enables a dynamic calibration via an image captured by a camera of a camera array.

Example 6 includes the system of any one of examples 1 to 5, including or excluding optional features. In this example, system of claim 1, where the inverse distortion polynomial includes even powers, and excludes odd powers.

Example 7 includes the system of any one of examples 1 to 6, including or excluding optional features. In this example, the system includes an image capture model, wherein the image capture model comprises a projective transform from an ideal image plane to a two-dimensional (2D) image.

Example 8 includes the system of any one of examples 1 to 7, including or excluding optional features. In this example, an initial estimate of the first set of coefficients and the second set of coefficients is calculated, and the inverse distortion polynomial and the alternative distortion model are calibrated simultaneously using the initial estimate.

Example 9 includes the system of any one of examples 1 to 8, including or excluding optional features. In this example, a bundle adjustment is used to simultaneously optimize the first set of coefficients and the second set of coefficients.

Example 10 includes the system of any one of examples 1 to 9, including or excluding optional features. In this example, a bundle adjustment comprises minimizing a cost function to iteratively optimize the first set of coefficients and the second set of coefficients.

Example 11 is a method for enabling a dual fisheye model and calibrator. The method includes calibrating coefficients of an inverse distortion polynomial, coefficients of an alternative distortion polynomial, and camera parameters simultaneously to model a real-world distortion of at least one fisheye camera.

Example 12 includes the method of example 11, including or excluding optional features. In this example, the camera parameters comprise sensor geometry parameters and alignment parameters.

Example 13 includes the method of any one of examples 11 to 12, including or excluding optional features. In this example, the coefficients of the inverse distortion polynomial, coefficients of the alternative distortion polynomial, and the camera parameters are generated via iterative non-linear optimization.

Example 14 includes the method of any one of examples 11 to 13, including or excluding optional features. In this example, the coefficients of the inverse distortion polynomial, coefficients of the alternative distortion polynomial, and the camera parameters are generated via a direct estimation.

Example 15 includes the method of any one of examples 11 to 14, including or excluding optional features. In this example, simultaneously the coefficients of the inverse distortion polynomial, coefficients of the alternative distortion polynomial, and the camera parameters to model a real-world distortion of the at least one fisheye lens is performed via an offline calibration with a calibration chart or another device.

Example 16 includes the method of any one of examples 11 to 15, including or excluding optional features. In this example, simultaneously calibrating the coefficients of the inverse distortion polynomial, coefficients of the alternative distortion polynomial, and the camera parameters to model a real-world distortion of the at least one fisheye camera is performed via a dynamic calibration.

Example 17 includes the method of any one of examples 11 to 16, including or excluding optional features. In this example, the inverse distortion polynomial includes even powers, and excludes odd powers.

Example 18 includes the method of any one of examples 11 to 17, including or excluding optional features. In this example, an image capture model comprises projective transform from an ideal image plane to a 2D image.

Example 19 includes the method of any one of examples 11 to 18, including or excluding optional features. In this example, a bundle adjustment is used to simultaneously optimize the coefficients of the inverse distortion polynomial and the coefficients of the alternative distortion polynomial.

Example 20 includes the method of any one of examples 11 to 19, including or excluding optional features. In this example, bundle adjustment comprising minimizing a cost function is used to simultaneously optimize the coefficients of the inverse distortion polynomial and the coefficients of the alternative distortion polynomial.

Example 21 is an apparatus. The apparatus includes a camera array comprising at least one fisheye camera; a calibration module that simultaneously generates a first set of coefficients of an inverse distortion polynomial representing a radial distortion of the fisheye camera and a second set of coefficients of an alternative distortion polynomial representing the fisheye camera.

Example 22 includes the apparatus of example 21, including or excluding optional features. In this example, the first set of coefficients and the second set of coefficients are optimized via an iterative non-linear optimization.

Example 23 includes the apparatus of any one of examples 21 to 22, including or excluding optional features. In this example, the first set of coefficients and the second set of coefficients are generated via a direct estimation.

Example 24 includes the apparatus of any one of examples 21 to 23, including or excluding optional features. In this example, the calibration module enables offline calibration of the camera array with a calibration chart or another device.

Example 25 includes the apparatus of any one of examples 21 to 24, including or excluding optional features. In this example, the calibration module enables a dynamic calibration via an image captured by the fisheye camera the camera array.

Example 26 includes the apparatus of any one of examples 21 to 25, including or excluding optional features. In this example, apparatus of claim 21, where the inverse distortion polynomial includes even powers, and excludes odd powers.

Example 27 includes the apparatus of any one of examples 21 to 26, including or excluding optional features. In this example, the apparatus includes an image capture model, wherein the image capture model comprises a projective transform from an ideal image plane to a two-dimensional (2D) image.

Example 28 includes the apparatus of any one of examples 21 to 27, including or excluding optional features. In this example, an initial estimate of the first set of coefficients and the second set of coefficients is calculated, and the inverse distortion polynomial and the alternative distortion model are calibrated simultaneously using the initial estimate.

Example 29 includes the apparatus of any one of examples 21 to 28, including or excluding optional features. In this example, a bundle adjustment is used to simultaneously optimize the first set of coefficients and the second set of coefficients.

Example 30 includes the apparatus of any one of examples 21 to 29, including or excluding optional features. In this example, a bundle adjustment comprises minimizing a cost function to iteratively optimize the first set of coefficients and the second set of coefficients.

Example 31 is at least one non-transitory machine-readable medium having instructions stored therein that. The computer-readable medium includes instructions that direct the processor to calibrate coefficients of an inverse distortion polynomial, coefficients of an alternative distortion polynomial, and camera parameters simultaneously to model a real-world distortion of at least one fisheye lens.

Example 32 includes the computer-readable medium of example 31, including or excluding optional features. In this example, the camera parameters comprise sensor geometry parameters and alignment parameters.

Example 33 includes the computer-readable medium of any one of examples 31 to 32, including or excluding optional features. In this example, the coefficients of the inverse distortion polynomial, coefficients of the alternative distortion polynomial, and the camera parameters are generated via iterative non-linear optimization.

Example 34 includes the computer-readable medium of any one of examples 31 to 33, including or excluding optional features. In this example, the coefficients of the inverse distortion polynomial, coefficients of the alternative distortion polynomial, and the camera parameters are generated via a direct estimation.

Example 35 includes the computer-readable medium of any one of examples 31 to 34, including or excluding optional features. In this example, simultaneously the coefficients of the inverse distortion polynomial, coefficients of the alternative distortion polynomial, and the camera parameters to model a real-world distortion of the at least one fisheye lens is performed via an offline calibration with a calibration chart or another device.

Example 36 includes the computer-readable medium of any one of examples 31 to 35, including or excluding optional features. In this example, simultaneously calibrating the coefficients of the inverse distortion polynomial, coefficients of the alternative distortion polynomial, and the camera parameters to model a real-world distortion of the at least one fisheye lens is performed via a dynamic calibration.

Example 37 includes the computer-readable medium of any one of examples 31 to 36, including or excluding optional features. In this example, the inverse distortion polynomial includes even powers, and excludes odd powers.

Example 38 includes the computer-readable medium of any one of examples 31 to 37, including or excluding optional features. In this example, an image capture model comprises projective transform from an ideal image plane to a 2D image.

Example 39 includes the computer-readable medium of any one of examples 31 to 38, including or excluding optional features. In this example, a bundle adjustment is used to simultaneously optimize the coefficients of the inverse distortion polynomial and the coefficients of the alternative distortion polynomial.

Example 40 includes the computer-readable medium of any one of examples 31 to 39, including or excluding optional features. In this example, bundle adjustment comprising minimizing a cost function is used to simultaneously optimize the coefficients of the inverse distortion polynomial and the coefficients of the alternative distortion polynomial.

Example 41 is an apparatus. The apparatus includes instructions that direct the processor to a camera array comprising at least one fisheye camera; a means to simultaneously generate a first set of coefficients of an inverse distortion polynomial representing a radial distortion of the fisheye camera and a second set of coefficients of an alternative distortion polynomial representing the fisheye camera.

Example 42 includes the apparatus of example 41, including or excluding optional features. In this example, the first set of coefficients and the second set of coefficients are optimized via an iterative non-linear optimization.

Example 43 includes the apparatus of any one of examples 41 to 42, including or excluding optional features. In this example, the first set of coefficients and the second set of coefficients are generated via a direct estimation.

Example 44 includes the apparatus of any one of examples 41 to 43, including or excluding optional features. In this example, the means to simultaneously generate the first set of coefficients and the second set of coefficients enables offline calibration of the camera array with a calibration chart or another device.

Example 45 includes the apparatus of any one of examples 41 to 44, including or excluding optional features. In this example, the means to simultaneously generate the first set of coefficients and the second set of coefficients enables a dynamic calibration via an image captured by the fisheye camera the camera array.

Example 46 includes the apparatus of any one of examples 41 to 45, including or excluding optional features. In this example, the inverse distortion polynomial includes even powers, and excludes odd powers.

Example 47 includes the apparatus of any one of examples 41 to 46, including or excluding optional features. In this example, the apparatus includes an image capture model, wherein the image capture model comprises a projective transform from an ideal image plane to a two-dimensional (2D) image.

Example 48 includes the apparatus of any one of examples 41 to 47, including or excluding optional features. In this example, an initial estimate of the first set of coefficients and the second set of coefficients is calculated, and the inverse distortion polynomial and the alternative distortion model are calibrated simultaneously using the initial estimate.

Example 49 includes the apparatus of any one of examples 41 to 48, including or excluding optional features. In this example, a bundle adjustment is used to simultaneously optimize the first set of coefficients and the second set of coefficients.

Example 50 includes the apparatus of any one of examples 41 to 49, including or excluding optional features. In this example, a bundle adjustment comprises minimizing a cost function to iteratively optimize the first set of coefficients and the second set of coefficients.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
   at least one memory; and
   at least one processor to execute instructions to:
     generate a first set of coefficients for an inverse distortion polynomial, the inverse distortion polynomial indicative of radial distortion of an image captured by a camera;
     generate a second set of coefficients for an alternative distortion polynomial, the alternative distortion polynomial to enable identification of a first point in the image corresponding to a second point in a three-dimensional space represented by the image; and
     determine a location of the camera within the three-dimensional space based on at least one of the inverse distortion polynomial or the alternative distortion polynomial.

2. The apparatus of claim 1, wherein the inverse distortion polynomial is to enable identification of a third point in the three-dimensional space corresponding to a fourth point in the image.

3. The apparatus of claim 1, wherein the at least one processor is to generate both the first and second sets of coefficients in parallel.

4. The apparatus of claim 1, wherein the at least one processor is to:
   generate a first initial estimate for the first set of coefficients;
   generate a second initial estimate for the second set of coefficients; and
   generate final estimates for both the first and second sets of coefficients simultaneously via a bundle adjustment process based on the first and second initial estimates.

5. The apparatus of claim 1, wherein the camera is a fisheye camera.

6. The apparatus of claim 1, wherein the inverse distortion polynomial includes even powers, and excludes odd powers.

7. At least one computing readable storage device comprising instructions that, when executed, cause at least one processor to at least:

generate a first set of coefficients for an inverse distortion polynomial, the inverse distortion polynomial indicative of radial distortion of an image captured by a camera;

generate a second set of coefficients for an alternative distortion polynomial, the alternative distortion polynomial to enable identification of a first point in the image corresponding to a second point in a three-dimensional space represented by the image; and determine a location of the camera within the three-dimensional space based on at least one of the inverse distortion polynomial or the alternative distortion polynomial.

8. The at least one computing readable storage device of claim 7, wherein the inverse distortion polynomial is to enable identification of a third point in the three-dimensional space corresponding to a fourth point in the image.

9. The at least one computing readable storage device of claim 7, wherein the instructions cause the at least one processor is to generate both the first and second sets of coefficients in parallel.

10. The at least one computing readable storage device of claim 7, wherein the instructions cause the at least one processor is to:

generate a first initial estimate for the first set of coefficients;

generate a second initial estimate for the second set of coefficients; and generate final estimates for both the first and second sets of coefficients simultaneously via a bundle adjustment process based on the first and second initial estimates.

11. The at least one computing readable storage device of claim 7, wherein the inverse distortion polynomial includes even powers, and excludes odd powers.

12. A method comprising:

generating, by executing an instruction with at least one processor, a first set of coefficients for an inverse distortion polynomial, the inverse distortion polynomial indicative of radial distortion of an image captured by a camera;

generating, by executing an instruction with the at least one processor, a second set of coefficients for an alternative distortion polynomial, the alternative distortion polynomial to enable identification of a first point in the image corresponding to a second point in a three-dimensional space represented by the image; and determining a location of the camera within the three-dimensional space based on at least one of the inverse distortion polynomial or the alternative distortion polynomial.

13. The method of claim 12, wherein the inverse distortion polynomial is to enable identification of a third point in the three-dimensional space corresponding to a fourth point in the image.

14. The method of claim 12, wherein the generating of both the first and second sets of coefficients is performed in parallel.

15. The method of claim 12, further including:

generating a first initial estimate for the first set of coefficients;

generating a second initial estimate for the second set of coefficients; and generating final estimates for both the first and second sets of coefficients simultaneously via a bundle adjustment process based on the first and second initial estimates.

16. The method of claim 12, wherein the inverse distortion polynomial includes even powers, and excludes odd powers.

17. An apparatus comprising:

means for capturing an image; and means for processing the image, the processing means to:

generate a first set of coefficients for an inverse distortion polynomial, the inverse distortion polynomial indicative of radial distortion of the image;

generate a second set of coefficients for an alternative distortion polynomial, the alternative distortion polynomial to enable identification of a first point in the image corresponding to a second point in a three-dimensional space represented by the image; and determine a location of the image capturing means within the three-dimensional space based on at least one of the inverse distortion polynomial or the alternative distortion polynomial.

18. The apparatus of claim 17, wherein the inverse distortion polynomial is to enable identification of a third point in the three-dimensional space corresponding to a fourth point in the image.

19. The apparatus of claim 17, wherein the processing means is to generate both the first and second sets of coefficients in parallel.

20. The apparatus of claim 17, wherein the processing means is to:

generate a first initial estimate for the first set of coefficients;

generate a second initial estimate for the second set of coefficients; and generate final estimates for both the first and second sets of coefficients simultaneously via a bundle adjustment process based on the first and second initial estimates.

21. The apparatus of claim 17, wherein the inverse distortion polynomial includes even powers, and excludes odd powers.

* * * * *